United States Patent
Shimizu et al.

[11] Patent Number: 5,836,419
[45] Date of Patent: Nov. 17, 1998

[54] RACK AND PINION ELECTRIC POWER STEERING SYSTEM WITH UNITIZED CONSTRUCTION FOR REMOVABLE MOUNTING

[75] Inventors: Yasuo Shimizu; Katsuji Watanabe, both of Wako, Japan

[73] Assignee: Honda Giken Kogyo Kabushiki, Kaisha, Japan

[21] Appl. No.: 580,072

[22] Filed: Dec. 20, 1995

[30] Foreign Application Priority Data

Dec. 21, 1994 [JP] Japan ................................. 6-318637

[51] Int. Cl.[6] ................................................... B62D 5/04
[52] U.S. Cl. ............................................ 180/443; 180/446
[58] Field of Search ............................. 180/443, 444, 180/445, 446, 447, 79.1

[56] References Cited

U.S. PATENT DOCUMENTS

| | | | |
|---|---|---|---|
| 4,241,804 | 12/1980 | Deininger et al. | 180/443 |
| 4,557,716 | 3/1986 | Norton | 180/446 |
| 4,588,060 | 5/1986 | Noron | 180/446 |
| 4,621,701 | 11/1986 | Takabayashi et al. | 180/446 |
| 4,726,437 | 2/1988 | Norton | 180/446 |
| 4,798,253 | 1/1989 | Naito | 180/446 |
| 4,895,216 | 1/1990 | Fusimi et al. | 180/446 |
| 4,986,381 | 1/1991 | Morishita et al. | 180/446 |
| 5,078,225 | 1/1992 | Ohmura et al. | 180/446 |
| 5,445,237 | 8/1995 | Eda et al. | 180/446 |

FOREIGN PATENT DOCUMENTS

| | | | |
|---|---|---|---|
| 60-234069 | 11/1985 | Japan . | |
| 64-4574 | 1/1989 | Japan | 180/446 |
| 1-115771 | 5/1989 | Japan | 180/446 |

*Primary Examiner*—Brian L. Johnson
*Assistant Examiner*—Gary Savitt
*Attorney, Agent, or Firm*—Adams & Wilks

[57] ABSTRACT

A unit-type electric power steering system comprises a steering mechanism having a first shaft and a second shaft. The first shaft has an input shaft for connection to a steering shaft, and an output shaft connected to the input shaft for angular displacement relative thereto and for connection in driving engagement with the second shaft. The second shaft is disposed in a case for displacement therein. A torque sensor detects a steering torque of the steering mechanism, and an electric motor outputs a steering assist force to the first shaft in response to the steering torque detected by the torque sensor. The first shaft, the torque sensor and the electric motor define components integrated into a single unit for removable connection to and disconnection from the second shaft and the case as a single unit without independent connection and disconnection of any one of the components.

23 Claims, 8 Drawing Sheets

RACK AND PINION ELECTRIC POWER STEERING SYSTEM WITH UNITIZED CONSTRUCTION FOR REMOVABLE MOUNTING

BACKGROUND OF THE INVENTION

1. Field of the Invention

The present invention relates generally to an electric power steering system and, in particular, to a unit-type electric power steering system having compatibility allowing application to a variety of steering systems including manual steering mechanisms.

2. Description of the Related Art

An electric power steering system is known which comprises a torque sensor for sensing a steering torque and an electric motor designed to produce, in response to the sensed steering torque, a steering assist force to be supplied via a power transmission to the steered wheel side of a rack-and-pinion steering mechanism.

Figure 8:
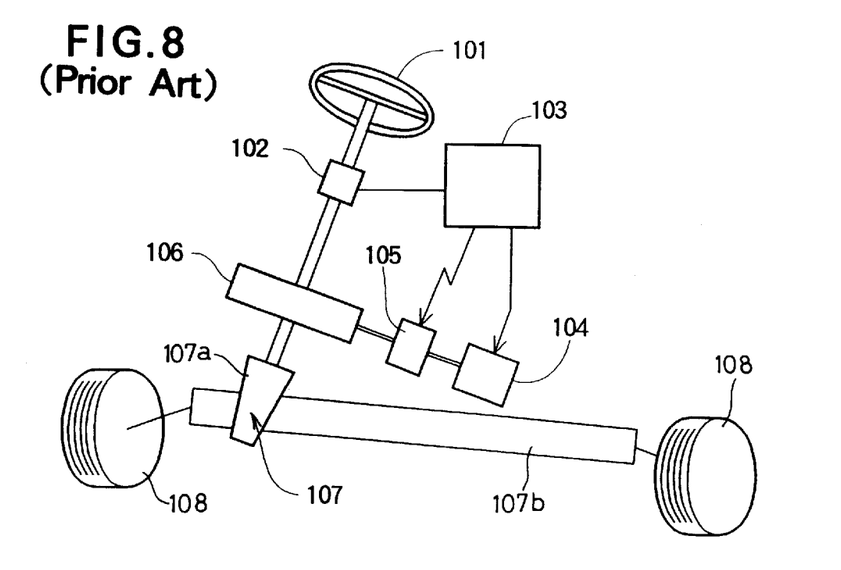
FIG. 8 is a schematic perspective view illustrating the general arrangement of a conventional electric power steering system.

FIG. 8 is a block diagram illustrating the functional arrangement of a steering mechanism including such conventional electric power steering system. A torque sensor 102 is provided on a steering shaft for sensing a steering torque of a steering wheel 101. In response to the output of the torque sensor 102, a controller 103 controls an electric motor 104 and the engaging-disengaging action of an electromagnetic clutch 105, whereby a steering assist force is supplied via a power transmission 106 to a rack-and-pinion mechanism 107, which consists of a rack 107b and a pinion 107a, to steer steered wheels 108.

Since the conventional electric power steering system is closely associated with a steering system having an axially long rack shaft, a large space is required in a performance test conducted on the electric power steering system with such shaft before it is mounted to a vehicle. Further, since it is necessary to apply a large load on the rack shaft during the performance test, the equipment used for such test inevitably becomes large in size.

With desire to impart compatibility to a power steering system, attempts have been made to provide a unit-type power steering system capable of being separated from the steering system. The results of such attempts are disclosed in, for example, Japanese Patent Laid-Open Publication No. SHO 60-234069.

Figure 9:
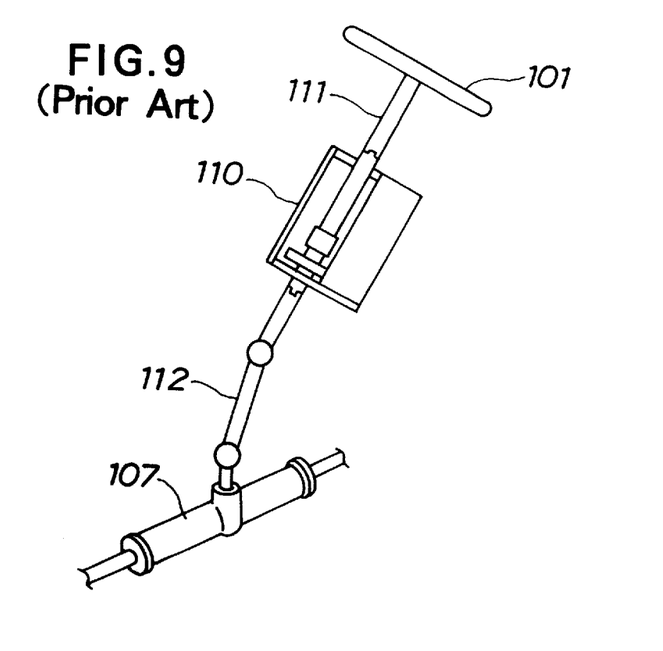
FIG. 9 is a schematic perspective view of the steering system employing a conventional unit-type power steering system.
Figure 10:
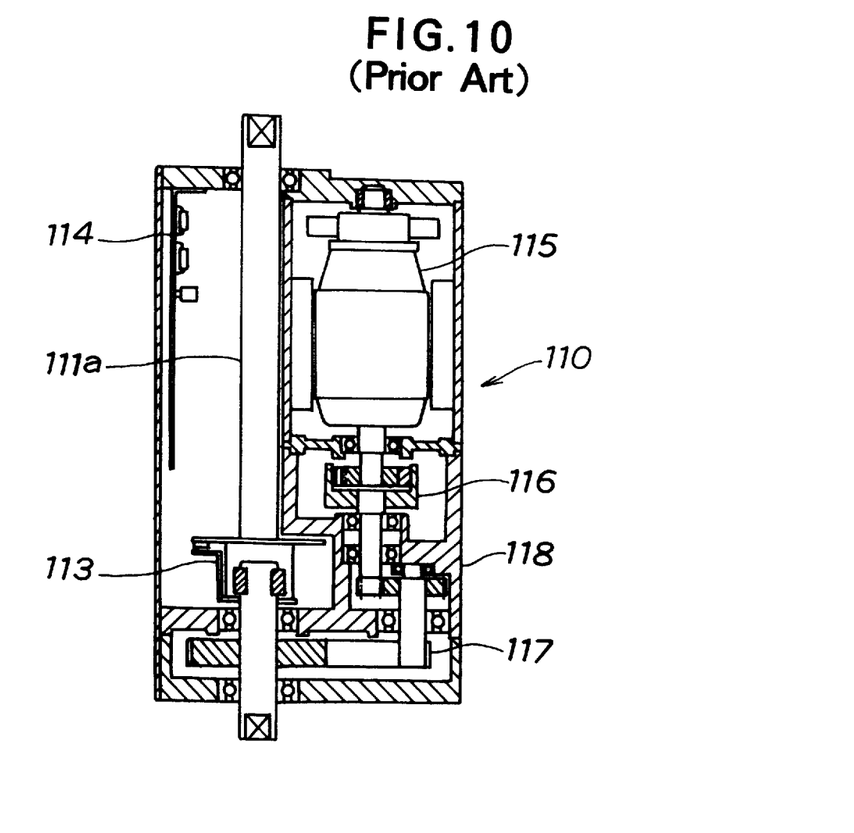
FIG. 10 is a longitudinal sectional view of the conventional unit-type power steering system.

FIG. 9 is a block diagram of a steering system employing the conventional unit-type power steering system, and FIG. 10 is a longitudinal section of the conventional unit-type power steering system.

The power steering system 110 is disposed at a middle portion of a steering shaft 111 and supplies an assist force to a universal joint 112 to cause the rack-and-pinion mechanism 107 to perform a steering operation.

As shown in FIG. 10, the unit-type power steering system 110 includes a torque sensor 113 provided on an intermediate shaft 111a coupled to the steering shaft 111, and a housing 118 within which a controller 114, a motor 115, a clutch 116 and a power transmission 117 are accommodated in a unitized manner.

Due to its layout, the above power steering system is positioned within a steering column and projects radially of the middle portion of the steering shaft, thus reducing a space in front of the knees of a driver. Further, since it is located near the instrument panel, noise control is required so that the electrical equipment such as a car radio is not adversely affected. Moreover, since the power steering system is located distantly from the power supply, a long wire harness with large current capacity is needed. In addition, since it is located at the middle portion of the steering shaft, the power steering system may not be used with the steering shaft column for manual steering, which is connected with a steering shaft to present a large component, thus limiting its range of compatibility to power steering systems of the same type.

One might propose to provide a unit-assembled power steering system and to dispose it at the rack portion. However, this arrangement also requires the system to be formed as a unitary structure including the rack shaft housing, whereby the range of compatibility of the system is limited as in the above case.

The present invention was made with a view to avoid the foregoing inconveniences which present a bar to the formation of a unit-type electric power steering system.

It is therefore an object of the present invention to provide a unit-type power steering system which has a wide range of applications, including manual steering mechanisms, and hence has excellent compatibility.

SUMMARY OF THE INVENTION

According to the present invention, there is provided a unit-type electric power steering system in which a steering torque of a rack-and-pinion steering mechanism is sensed and an electric motor is controlled to output, in response to the sensed steering torque, a steering assist force to be supplied to a pinion shaft so as to power-assist the movement of steered wheels, wherein a steering force input shaft and a pinion forming a final output shaft are formed in unitized relation with each other so that the electric power steering system can be removably attached to a rack shaft case for retaining a rack shaft.

In a specific form of the invention, the electric power steering system includes a torque sensor for sensing a steering torque, a motor, and a power transmission, which are formed in unitized relation with the pinion shaft of the steering mechanism. The electric power steering system also includes a controller, a housing, a transmission mechanism accommodated within the housing, an electric motor integrated with the housing, an input shaft having a main portion received within the housing and a shaft portion with an upper half projecting upwardly of the housing, and an output shaft having a main portion received in the housing and a pinion portion projecting downwardly of the housing.

The housing of the electric power steering system is provided with a first mounting flange at a lower end portion thereof. The rack shaft case includes a pinion case with a opening into which the pinion shaft is fitted. Around the periphery of the opening, there is provided a second mounting flange to be separably joined with the first mounting flange so that the rack shaft case and the electric power steering system also become unitary with the housing.

As is now apparent, in the present invention, the structural elements of the electric power steering system, such as the torque sensor, are connected in a unitized manner with the pinion shaft, whereby the system can be treated as a single unit member equivalent to a single pinion shaft. In addition, since it is as a unit and removably mounted to the rack shaft case, compatibility is provided between a universal joint on the steering wheel side and the rack shaft on the steered wheel side. Moreover, since changeover to and from a manual steering mechanism is enabled, the manual steering mechanism, designed as such, can be replaced later on with an electric power steering system, leading to a wide range of applications of the latter.

BRIEF DESCRIPTION OF THE DRAWINGS

The present invention will hereinafter be described in further detail with reference to the accompanying drawings, in which.

DETAILED DESCRIPTION

Figure 1:
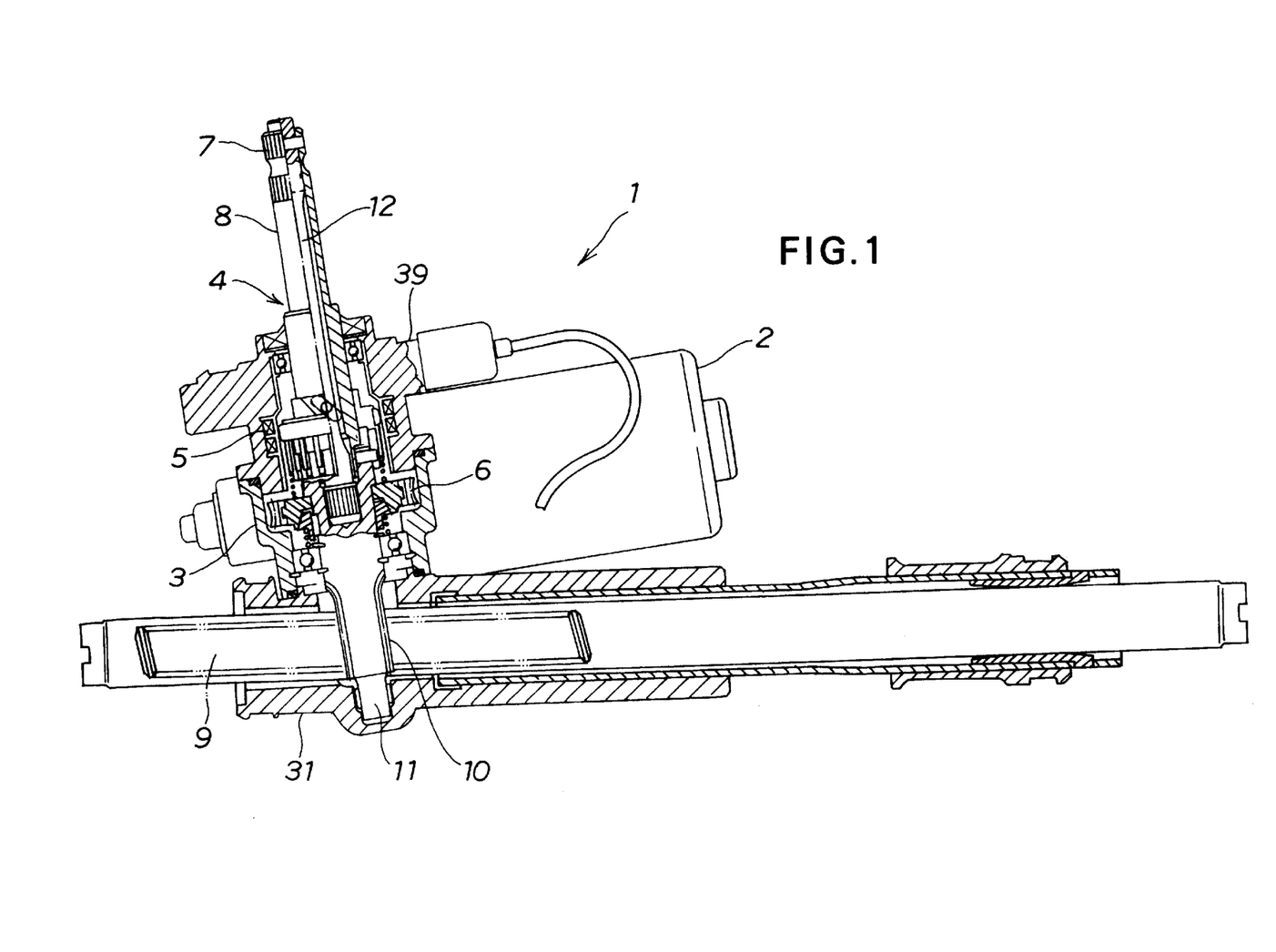
FIG. 1 is a cross-sectional view taken longitudinally of an electric power steering system according to a first embodiment of the present invention.

Reference is initially taken to FIG. 1, in which an electric power steering system according to a first embodiment of the present invention is shown in longitudinal section.

The power steering system 1 is formed as a unit with a first shaft or pinion shaft 4 extending upwardly and downwardly of a housing 3, which supports a motor 2 in a unitized manner. The pinion shaft 4 has a torque sensor 5 for sensing an axe action torque or steering torque, and a power transmission 6 designed to transmit an assist force of the motor 2 to the pinion shaft 4.

Figure 2:
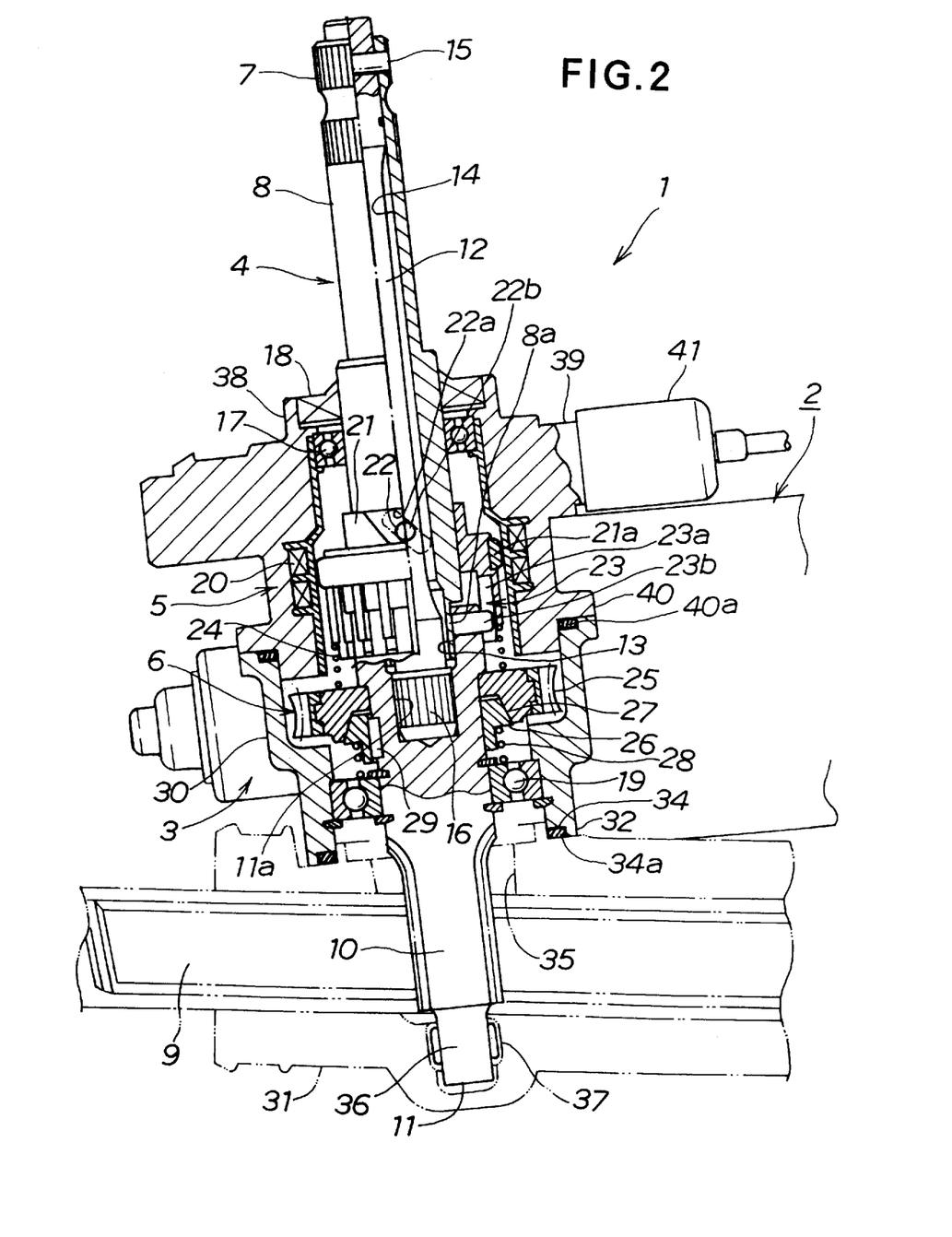
FIG. 2 As an enlarged longitudinal sectional view of the main parts of FIG. 1.

The details of the power steering system 1 are as shown in FIG. 2. The pinion shaft 4 is comprised of a hollow input shaft 8 having a serration 7 provided in an upper portion thereof for fixing to a steering shaft, an output shaft 11 having a pinion 10 provided in a lower portion thereof for mated engagement with a second shaft or rack shaft 9, and a torsion bar 12 forming an elastic connecting portion interposed between the input and output shafts 8 and 11 for allowing the relative rotational operation of the input and output shafts 8 and 11.

The lower portion 8a of the input shaft 8 is rotatably connected to the output shaft 11 shown in FIG. 2 through an engagement portion 13 formed in the upper portion of the output shaft 11. In the hollow portion 14 of the input shaft 8, the torsion bar 12 is provided so as to penetrate into the hollow portion 14, and an upper end portion of the torsion bar 12 is fixed to the upper portion of the input shaft 8 with a pin 15. In a lower end portion of the torsion bar 12, a serration 16 is formed and fixed to the serration fit portion 11a of the output shaft 11.

The input shaft 8 of the pinion shaft 4 is journaled through a bearing 17 and an oil seal 18 with respect to the upper portion of the housing 3. The output shaft 11 is journaled in the lower portion of the housing 3 through a bearing 19.

The torque sensor 5 is comprised of a differential transformer 20 and includes a cylindrical slide member 21 slidably mounted on the outer periphery of the input shaft 8, and a ring-shaped, non-magnetic conductor member 21a provided on the outer periphery of the slide member 21. The slide member 21 includes a diagonal guide 22 between the input shaft 8, the guide 22 consisting of a groove 22a for guiding the slide member 21 in an angular direction at 45° with respect to a circumferential direction, and a pin 22b engaging with the groove 22a. The pin 22b is fixed to the input shaft 8 so as to project in a radial direction, and the groove 22a extends diagonally in the slide member 21.

Further, the slide member 21 has a longitudinal guide 23 between the output shaft 8, the guide 23 being consisting of an axial groove 23a, and a pin 23b engaging with the groove 23a. The pin 23b is provided in the upper end portion of the output shaft 11 so as to project in the radial direction, and the groove 23a is provided in the slide member 21. A spring 24 is disposed at an end portion of the slide member 21 at the output shaft 11 side for urging the slide member 21 in the direction of the input shaft 8 to thereby suppress the play in the axial operation of the slide member 21.

The steering input to the above input shaft 8 is transmitted to the output shaft 11 through the torsion bar 12, and the steering input to the output shaft 11 by the torsion bar 12 from the input shaft 8 and the relative displacement in direction of rotation to the input shaft 8 and the output shaft 11 are converted into the axial displacement of the slide member 21 by the engagement between the groove 22a and the pin 22b forming the diagonal guide 22.

On the other hand, the slide member 21 is allowed to displace in the axial direction by the engagement between the groove 23a and the pin 23b, that is, the slide member 21 is moved in the axial direction by the respective guides 22 and 23 in proportion to the relative rotational operation between the input shaft 8 and the output shaft 11. The above differential transformer 20 forms a torque sensor which outputs a signal corresponding to the magnitude and the direction of action of the torque acting on the input shaft 8.

The power transmission 6 is made up of a ring-shaped member 25 rotatably mounted on the outer periphery of the output shaft 11, and an advance-retract member 26. The ring-shaped member 25 consists of a large-diameter worm wheel, and, although not shown, it is constructed so that the output of the motor 2 is transmitted to the worm wheel 25 or to the output shaft 11 by the engagement between the worm on the rear side and the worm wheel 25 in FIG. 2, and the worm on the motor 2 side and the worm wheel 25 form a reduction mechanism.

Further, between the above ring-shaped member 25 and advance-retract member 26, an uneven tapered friction surface 27 is formed which uses a wedge effect to enable a torque to be transmitted by a small spring force, and the advance-retract member 26 is pressed by a spring 28 in the engagement direction. By this construction a torque limiter is formed which transmits a torque to the pinion 10 through a key 29 interposed between the output shaft 11 and the advance-retract member 26 while limiting an excessive torque.

In the above described power transmission 6, a compact reduction mechanism can be formed by the ring-shaped member 25. Also, the motor can be made small-sized.

Further, by the clutch mechanism having the tapered friction surface 27, the whole system is made small-sized in addition to the miniaturization of the clutch and the simplification of a controller by the provision of the torque limiter for limiting the transmitted torque, whereby the unit can be handled more easily.

The lower half portion 30 of the housing 3 has a flange 32 forming the connecting portion for the rack shaft case 31, and the flange 32 has bolt holes 33 for attaching it to the mounting flange 31c of the rack shaft case 31, and a liquid-tight fit portion 34 for connecting the flanges 32 and 31c through a seal material 34a in a liquid tight manner. In the mounting flange 31c of the rack shaft case 31, there are provided bolt holes 31d corresponding to the above bolt holes 33.

With the above construction, the housing 3 is removably liquid-tightly fixed to the opening 35 inside the flange 31c of the rack shaft case 31, and the fit portion 36 forming the end portion of the output shaft 11 is now supported by a bearing 37 on the rack shaft case 31 side.

In the upper half portion 38 of the housing 3, a controller 39 for determining the steering assist force based on the output of the torque sensor 5 is integrally connected by means of a resin member. At a connecting portion 40 opposite from the lower half portion 30 of the housing 3, seal materials 40a are provided for liquid-tightly connecting the lower half portion 30 with the upper half portion 38. Further, the above controller 39 and the motor 2 are connected by means of a watertight plug 41.

The operation of the above power steering system is described below.

If the input shaft 8 is rotated from the steering shaft side, the torsion bar 12 is twisted, and the differential transformer 20 senses the axial displacement of the non-magnetic conductor member 21a which is caused by the relative rotational operation to the output shaft 11 and outputs a signal corresponding to the magnitude and direction of action of the torque. The controller 39 uses the output signal to determine the direction of rotation of the motor 2 and the magnitude of the torque according to the direction of action and magnitude of the above torque. Its output is doubled by the reduction mechanism of the ring-shaped member 25, and the torque is transmitted to the output shaft 11 while an excessive torque is limited by the torque limiter 26.

In the power steering system as constructed above, the torque sensor senses the steering torque and the assist torque is supplied to its output side by the ring member of the power transmission, and thus it has the function as an electric power steering only with the torque sensor.

Accordingly, by managing the characteristics of the sensor, the performance of the power steering system can be managed.

In the performance test of a power steering system, it has so far been needed to measure its output on the rack shaft of the steering system by the use of a high-load, large-stroke tester. In contrast to this, the power steering system of the present invention needs no long rack shaft and steering shaft since the main parts are collected in a unitized manner between the input and output shafts which are forming the pinion shaft, so that the tester can be made small-sized to reduce the testing space. In addition, since the power steering system of the present invention constitutes a compact unit, the space for storing it can be substantially reduced.

When the power steering system is built in a steering system, it is mounted as a pinion shaft unit by inserting the pinion 10 of its output shaft 11 into the opening 35 of the rack shaft case 31, superposing the flange 32 of the housing 3 on the flange 31c of the rack shaft case 31, and bolting the flanges 32 and 31c together. Further, the steering shaft side is fitted and fixed to the serration 7 of the input shaft 8.

Thus, a steering system equipped with the power steering system is completed between the universal joint shaft and the rack shaft, an assist force is supplied according to the torque acting on the steering wheel, and the rack shaft 9 moves in the axial direction to perform a steering operation.

Since the rack-and-pinion mechanism is positioned in the lower portion of the engine room when the power steering system related to the present invention is built in a vehicle, there is no effect on the space within the vehicle. In addition, since the power supply of a front-engine vehicle is positioned near the pinion shaft, the power supply connection is enabled by a short wire harness, the unit exchange can be performed in the same manner as the exchange of the pinion shaft for manual steering without removing the rack shaft or tie rod. Accordingly, the cost of replacement parts is suppressed, and the replacement work is done in a short time, so that repair and maintenance are easily performed.

Now, description is made to the compatibility between the manual steering system and the electric power steering system.

Figure 3:
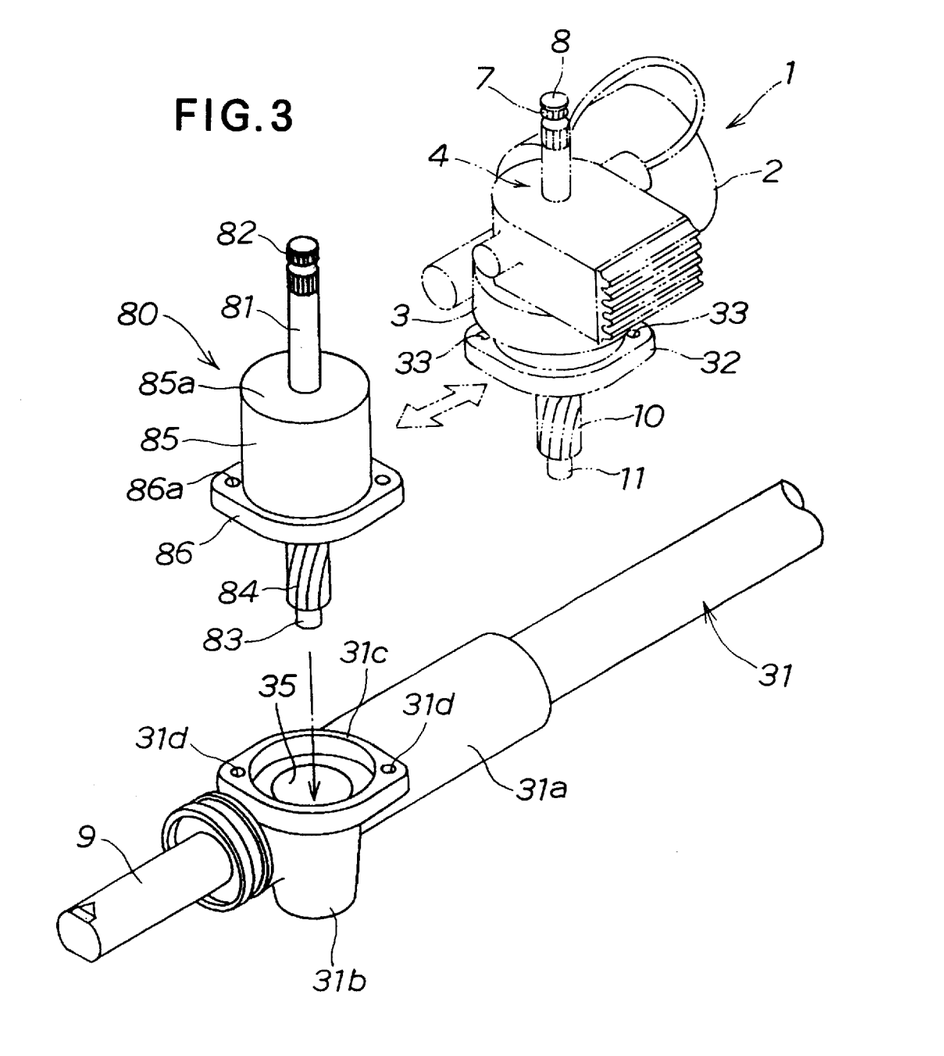
FIG. 3 is an exploded perspective view showing a mode of attachment of a manual steering system and the electric power steering system, the manual steering system being shown by solid lines and the electric power steering system being shown by phantom lines.

As described above, the case 31 of the rack shaft 9 slidably houses the rack shaft 9 in the axial direction, the large-diameter portion 31a is provided in a portion of the rack shaft case 31 which is near one end thereof, and on one side of the large-diameter portion, the vertically oriented pinion case 31b is integrally provided. The pinion case 31b has the opening 35 in the upper portion thereof.

On the rear end periphery of the opening 35 of the pinion case 31b, the outwardly expanding flange 31c is provided, and the flange 31c has the mounting screw holes 31d.

FIG. 3 is an explanatory perspective view showing the mounting relationships among the rack shaft 9 and the rack shaft case 31, a manual steering system 80, and the electric power steering system 1.

In the manual steering system 80, a gear mechanism, not shown, and the like are accommodated in a housing 85, and above the upper surface 85a of the housing 85, an input shaft 81 is projecting which has a serration 82 to be connected to the steering shaft, while a pinion 84 forming an output shaft 83 is projecting from the bottom surface of the housing. On the lower end periphery of the housing 85, there is provided a flange 86 corresponding to the above flange 31c of the pinion case 31b, and mounting holds 86a are formed in the flange 86.

FIG. 3 shows the state before the manual steering system 80 is attached to the rack shaft case 31, or the state in which it is removed. The power steering system 1 is shown by phantom lines.

Figure 4:
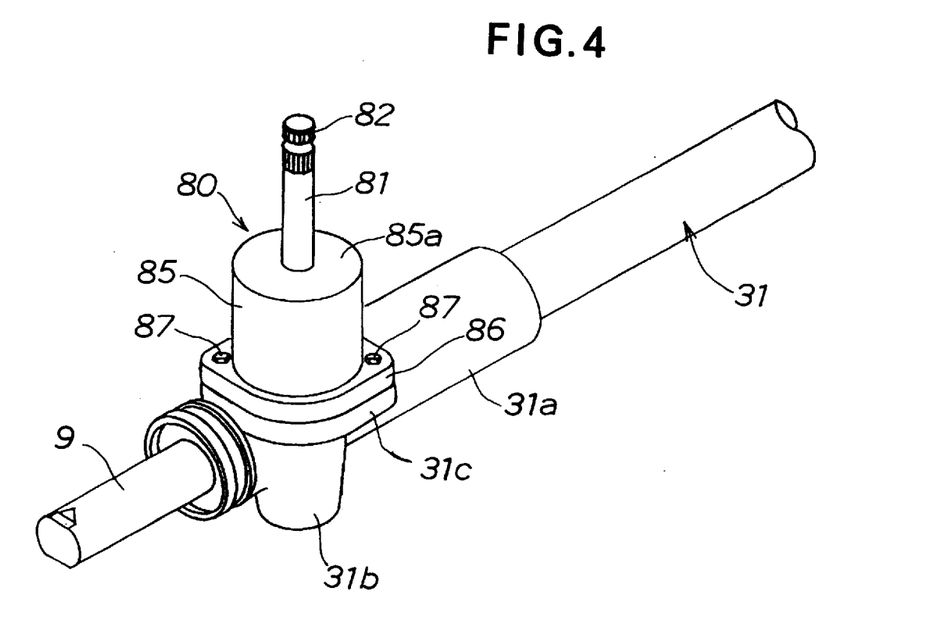
FIG. 4 is a perspective view of a state in which the manual steering stem is attached to a rack shaft case.

FIG. 4 is a perspective view showing the state in which the manual steering system 80 is connected in a unitized manner to the flange 31c of the pinion case 31a of the rack shaft case 31 through the flange 86 of the housing 85 and by bolts 87 in the mounting holes 86a and 31d. The pinion 84 of the above output shaft 83 of the manual steering system 80 is inserted from the opening 35 into the pinion case 31b and engages with the rack shaft 9, and the steering input transmitted to the input shaft 81 is transmitted to the rack shaft 9 through the pinion 84 of the output shaft 83 to steer the steered wheel.

Figure 5:
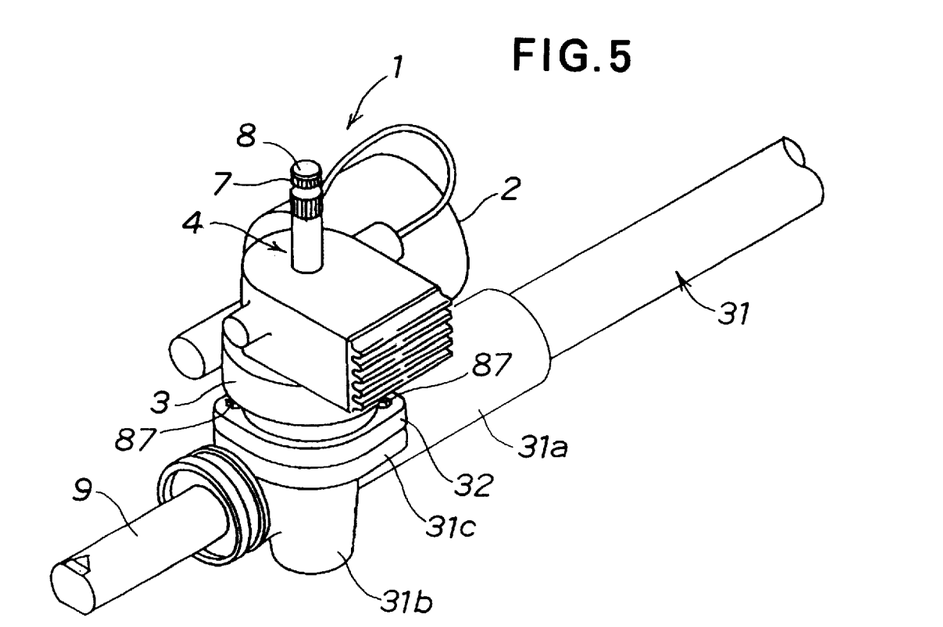
FIG. 5 is a perspective view showing a state in which the electric power steering system is attached to the rack shaft case.

FIG. 5 shows the state in which the electric power steering system 1 related to the present invention is mounted to the pinion case 31b of the rack shaft case 31.

For the electric power steering system 1, the above flange 32 formed in the lower end portion of the housing 3 is superposed on the flange 31c of the pinion case 31b of the rack shaft case 31, and bolts 87 are inserted into the mounting holes 33 and 31d to couple the housing 3 to the pinion case 31b of the rack shaft case 31. The engagement between the pinion 10 of the output shaft 11 and the rack shaft 9 is as described above.

Thus, the manual steering system 80 and the electric power steering system 1 can be selectively mounted, and a wide range of compatibility is ensured.

Figure 6:
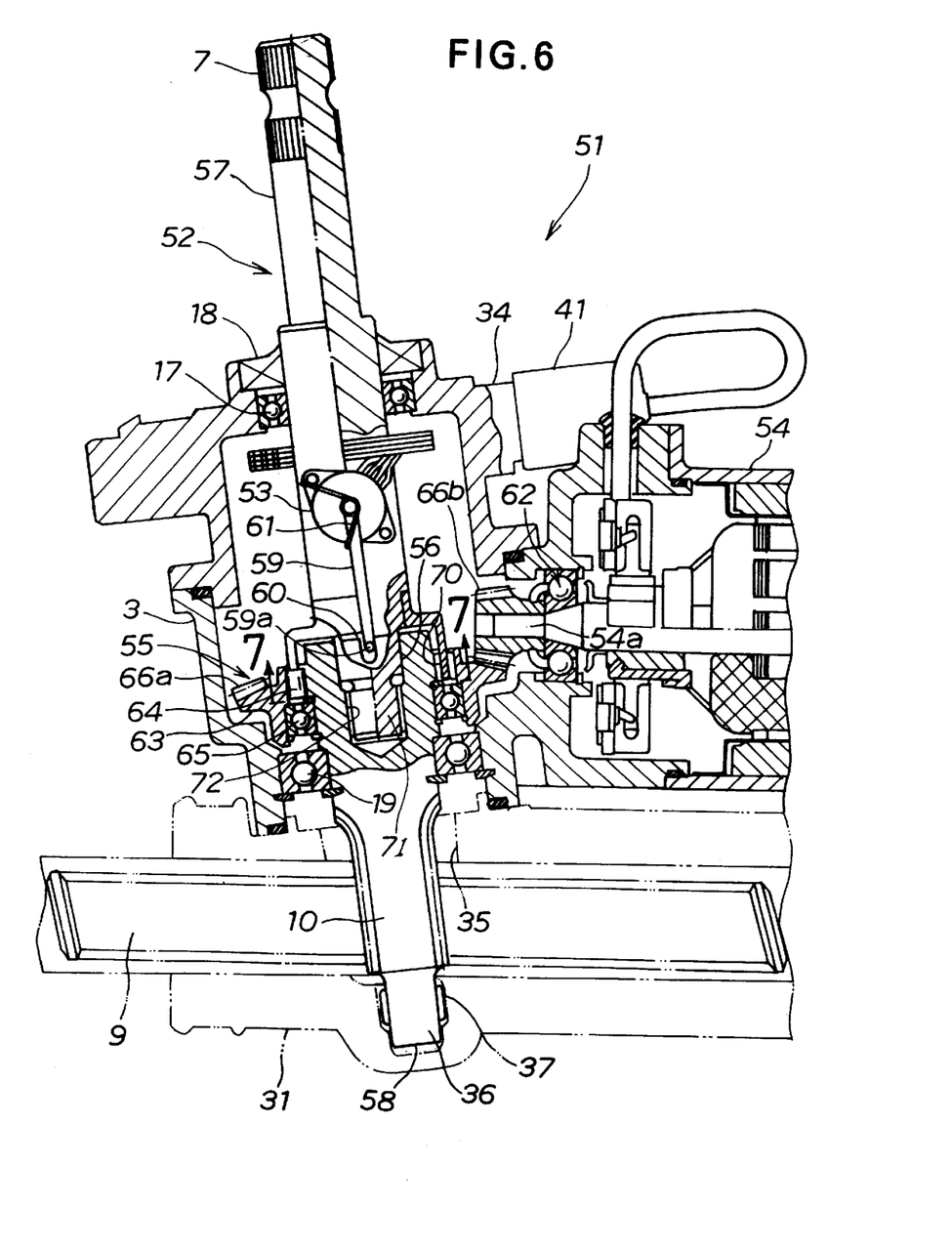
FIG. 6 is an enlarged longitudinal sectional view showing the main portions of the electric power steering system according to a second embodiment of the present invention.
Figure 7:
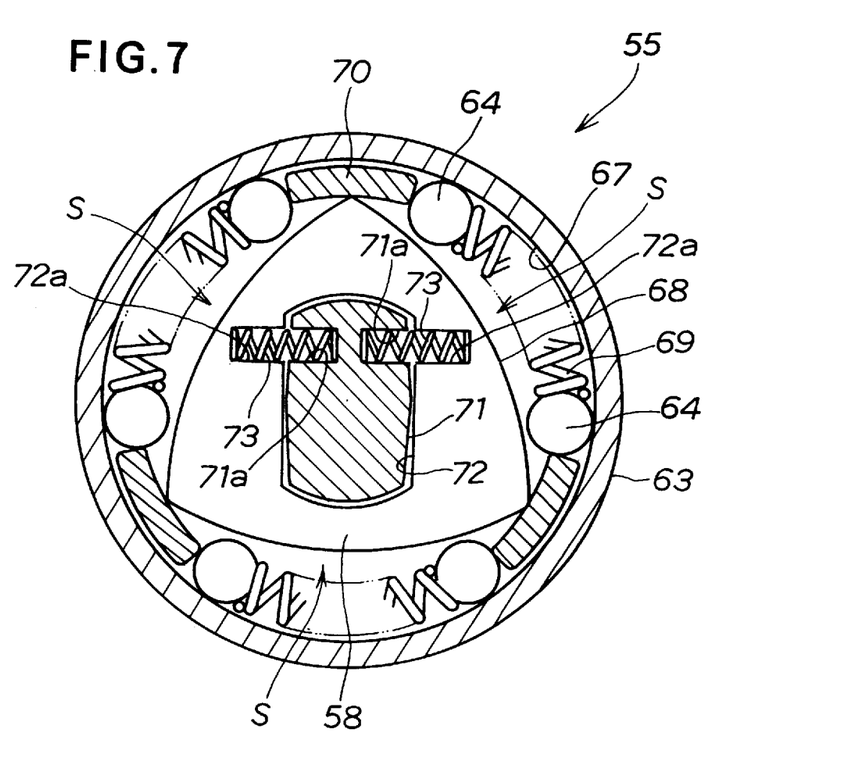
FIG. 7 is a cross-sectional view taken along line 7—7 of FIG. 6.

The second embodiment of the present invention is now described. FIG. 6 is a longitudinal sectional view of the power steering system related to the second embodiment, and FIG. 7 is a sectional view along line 7—7 of FIG. 6; the members equivalent to the above described embodiment is assigned the same symbols and the pertinent description is omitted.

On the pinion shaft 52 of a power steering system 51, there are provided a torque sensor 53 for sensing the torque acting on the pinion shaft 52, and a power transmission 55 for supplying the assist force of a motor 54 to the pinion shaft 52.

The pinion shaft 52 consists of an input shaft 57 and an output shaft 58 which are rotatably connected to each other through a fit portion 56. The torque sensor 53 is provided on the input shaft 57, and the power transmission 55 is provided on the output shaft 58.

The torque sensor 53 has an arm-like rotary member 59 to form a variable resistor which outputs a signal corresponding to a rotation position. The rotary member 59 engages its end portion 59a with a recessed portion 60 provided in the top of the output shaft 58 and has a spring 61 for suppressing the play of the rotary member 59 in the direction of rotation, and outputs a signal according to the rotation position of the rotary member 59 by the relative rotational operation of the input shaft 57 and the output shaft 58.

The power transmission 55 comprises a planetary reduction mechanism 62 for decelerating and transmitting the rotation of the motor 54, a ring-shaped member 63 for further decelerating and outputting the decelerated rotation output, and roller-shaped transmission members 64 for transmitting the rotational force of the ring-shaped member 63 to the output shaft.

The planetary reduction mechanism 62 rotatably journals the output of the motor 54 by means of a plurality of balls, as described above, and has a carrier member making a retainer for retaining the balls an output.

In the above ring member 63, a bearing 65 is rotatably mounted on the outer periphery of the output shaft 58. A large-diameter hypoid gear 66a is formed on the outer periphery side of the ring-shaped member 63, and the hypoid gear 66a is provided integrally with the carrier of the planetary reduction mechanism 62. The hypoid gear 66a engages with a small-diameter hypoid gear 66b, which is slidably journaled on the output shaft 54a of the motor 54. A reduction mechanism is made up of the large-diameter hypoid gear 66a and the small-diameter hypoid gear 66b engaging with the gear 66a.

The inner peripheral side of the ring-shaped member 63 constitutes a circular supply-side transmission surface 67, as shown in FIG. 7. A substantially triangular output-side transmission surface 68 is provided opposite to the supply-side transmission surface 67 to form wedge-like spaces S between them. The wedge-like spaces S are formed for the respective peripheries of the output-side transmission surface 68, that is, three spaces are formed.

In each wedge-like space S described above, there are provided a pair of the transmission members 64 and a spring 69 for urging those transmission members 64 in the direction of engagement with both of the inner and outer surfaces, and an engagement/disengagement control member 70 is provided between the adjacent wedge-like spaces S for engaging and disengaging the transmission members 64, thereby to form a mechanical clutch. The engagement/disengagement control member 70 is connected in a unitized manner with the input shaft 57 and acts on the transmission members 64 according to the relative rotation between the input shaft 57 and the output shaft 58.

Between the input shaft 57 and the output shaft 58, a substantially rectangular projecting portion 71 is provided on the input shaft 57 side, and a similarly shaped recessed portion 72 is provided on the output shaft 58 side, so that a rotation engagement portion which fits with clearance in the direction of rotation is formed of the projecting and recessed portions 71 and 72. Spring receiving recessed portions 71a are provided on the left and right sides of the projecting portion 71 as shown in FIG. 7, spring receiving recessed portions 72a are provided on the opposing surface of the recessed portion 72, and elastic members 73 made up of a compression spring are interposed between the opposing surfaces of the receiving recessed portions 71a and 72a. The elastic members 73 allow the relative rotational operation between the input shaft 57 and the output shaft 58.

When the input shaft 57 is rotated, the elastic members 73 bend, and the engagement/disengagement control members 70 are rotated relatively to the output shaft 58. If the engagement/disengagement members 70 are rotated and retract from one wedge-like space, the transmission members 64 receiving the pressure of the spring 69 enter the corner portion of the wedge-like spaces. At this point, if the ring-shaped member 63 is driven in the same direction as the engagement/disengagement control members 70, the transmission members 64 are engaged between the supply-side transmission surface 67 and the output-side transmission surface 68 in the same corner, whereby one-way clutch is formed and the torque is transmitted.

In this case, when the ring-shaped member is reversely rotating or at rest, the transmission members 64 act in the direction in which the wedge-like spaces expand and are not engaged between both surfaces, and thus the torque transmission is interrupted and the output shaft receiving the torque of the input shaft through the elastic members 73 is manually rotated without receiving the reverse torque from the ring-shaped member.

If the load on the output shaft 58 side is particularly large, the projecting portion 71 and the recessed portion 72 of the rotation engagement portion abut on each other to transmit the input shaft torque, so that the excessive delay and torsion on the output shaft 58 side are avoided and the unnatural operation of the engagement/disengagement control members 70 and the elastic members 73 is prevented.

On the other hand, during the torque transmission, if the engagement/disengagement control members 70 are rotated in the direction of disengaging the engagement of the transmission members 64, the transmission members 64 are precluded from the corner portion of the wedge-like spaces by the operation of the engagement/disengagement control members 70 to interrupt the torque transmission even if the ring-shaped member 63 is rotated in an opposite direction with respect to the engagement/disengagement control members 70, so that the output shaft 58 operates following the operation of the input shaft 57 side without receiving the reverse torque.

In the unit-type electric power steering system constructed as above, the excessive delay in rotation on the output shaft 58 side and the unnatural operation of the engagement/disengagement control member 70 can both be avoided by its rotation engagement portion, and thus stable steering characteristics are ensured. Further, in the mechanical clutch employing the engagement/disengagement control members 70, the engagement/disengagement control members 70 caused to operate by the relative rotation between the input and output shafts 57 and 58 control the engagement and disengagement of the transmission members 64 in the wedge-like spaces S, so that the torque is transmitted to the output shaft 58 side only when the rotation of the torque supply shaft and the control direction of the engagement/disengagement control members 70 are in coincidence, and thus no load torque opposed to the operation of the input shaft 57 is received from the torque supply shaft side and torque control following the operation of the input shaft 57 is enabled. Accordingly, a compact unit-type electric power steering system can be formed as in the aforementioned embodiment.

Moreover, in the planetary reduction mechanism 62, the transmission force is limited by the slip of the balls rolling between the inner and outer rings when the excessive torque of the motor 54 is received, and it thus performs the torque limiter function.

As thus far explained in detail, in the present invention, the structural elements of the electric power steering system, such as the torque sensor, are connected in a unitized manner with the pinion shaft, so that it can be handled as a unit member corresponding to a single pinion shaft. Further, since it is a unit which can be mounted on and removed from the rack shaft case, compatibility is secured between the universal joint on the steering shaft side and the rack shaft on the steered wheels, so that it can easily be exchanged with a manual steering mechanism. Accordingly, the electric power steering system can be mounted in a steering mechanism designed for a manual steering mechanism, and it is widely applicable to steering mechanisms.

In addition, if the power transmission is formed of a ring-shaped member and provided with a reduction mechanism and a clutch mechanism, a compact reduction mechanism of a large reduction ratio can be obtained, and the motor can be made small-sized and the complex control load of the motor due to the restriction of the transmission torque can be avoided, whereby the unit is made small-sized and handled more easily.

What is claimed is:

1. An electric power steering system comprising:
    a rack-and-pinion steering mechanism having a pinion shaft and a rack shaft, the pinion shaft having an input shaft for connection to a steering shaft and an output shaft connected to the input shaft for angular displacement relative thereto, the output shaft having a pinion in mating engagement with the rack shaft;
    a rack shaft case, the rack shaft being disposed in the rack shaft case for axial displacement therein;
    a torque sensor for detecting a steering torque of the rack-and-pinion steering mechanism; and
    an electric motor for outputting, in response to the steering torque detected by the torque sensor, a steering assist force to the pinion shaft to power-assist the movement of steered wheels via the rack-and-pinion steering mechanism;
    wherein the pinion shaft, the torque sensor and the electric motor define components integrated into a single unit for removable connection to and disconnection from the rack shaft and the rack shaft case as a single unit without independent connection and disconnection of any one of the components.

2. A power steering system according to claim 1; wherein the single unit further includes a power transmission for transmitting the steering assist force from the electric motor to the pinion shaft.

3. A power steering system according to claim 2; wherein the single unit further includes a controller for controlling the electric motor.

4. A power steering system according to 3; wherein the single unit further includes a housing containing therein the torque sensor, the power transmission and the electric motor; wherein the input shaft has a first shaft portion disposed within the housing and a second shaft portion projecting outwardly from the housing; and wherein the output shaft has a first shaft portion disposed within the housing and a second shaft portion projecting outwardly from the housing.

5. An electric power steering system according to claim 4; wherein the housing comprises a first mounting flange at a lower end thereof; and wherein the shaft case comprises a pinion case having an opening for receiving the output shaft of the pinion shaft for mating engagement with the rack shaft, and a second mounting flange disposed at the Periphery of the opening for connection to the first mounting flange of the housing to join the single unit to the rack shaft case.

6. An electric power steering system according to claim 3; wherein the power transmission comprises a reduction mechanism for decelerating the output of said electric motor, the reduction mechanism having a mechanical clutch mechanism for engaging and disengaging the output of said motor.

7. An electric power steering system according to claim 5; wherein the second shaft portion of the input shaft projects outwardly from the housing for connection to the steering shaft; and wherein the second shaft portion of the output shaft comprises the pinion for mating engagement with the rack shaft.

8. An electric power steering system according to claim 4; wherein the second shaft portion of the input shaft projects outwardly from the housing for connection to the steering shaft; and wherein the second shaft portion of the output shaft comprises the pinion for mating engagement with the rack shaft.

9. An electric power steering system according to claim 2; wherein the single unit further includes a housing containing therein the torque sensor, the power transmission and the electric motor; wherein the input shaft has a first shaft portion disposed within the housing and a second shaft portion projecting outwardly from the housing; and wherein the output shaft has a first shaft portion disposed within the housing and a second shaft portion projecting outwardly from the housing.

10. An electric power steering system according to claim 9; wherein the housing comprises a first mounting flange at a lower end thereof; and wherein the shaft case comprises a pinion case having an opening for receiving the output shaft of the pinion shaft for mating engagement with the rack shaft, and a second mounting flange disposed at the periphery of the opening for connection to the first mounting flange of the housing to join the single unit to the rack shaft case.

11. An electric power steering system according to claim 2; wherein the power transmission comprises a reduction mechanism for decelerating the output of said electric motor, the reduction mechanism having a mechanical clutch mechanism for engaging and disengaging the output of said motor.

12. An electric power steering system according to claim 1; wherein the single unit further includes a controller for controlling the electric motor.

13. An electric power steering system comprising: a steering mechanism having a first shaft and a second shaft, the first shaft having an input shaft for connection to a steering shaft and an output shaft connected to the input shaft for angular displacement relative thereto and for connection in driving engagement with the second shaft; a case housing therein the second shaft; a torque sensor for detecting a steering torque of the steering mechanism; and an electric motor for outputting a steering assist force to the first shaft in response to the steering torque detected by the torque sensor; wherein the first shaft, the torque sensor and the electric motor jointly constitute a single unit which is removably connectable to and disconnectable from the second shaft and the case without disassembly of the single unit.

14. An electric power steering system according to claim 13; wherein the single unit further includes a power transmission for transmitting the steering assist force from the electric motor to the first shaft.

15. An electric power steering system according to claim 14; wherein the single unit further includes a controller for controlling the electric motor.

16. An electric power steering system according to claim 14; wherein the single unit further includes a housing containing therein the torque sensor, the power transmission and the electric motor.

17. An electric power steering system according to claim 16; wherein the input shaft of the first shaft has a first input shaft portion disposed within the housing and a second input shaft portion projecting outwardly from the housing for connection to the steering shaft; and wherein the output shaft has a first output shaft portion disposed within the housing and a second output shaft portion projecting outwardly from the housing for connection in driving engagement with the second shaft.

18. An electric power steering system according to claim 16; wherein the housing has a first mounting flange at an end thereof; and wherein the case has an opening for receiving the output shaft of the first shaft for driving engagement with the second shaft, and a second mounting flange disposed at the periphery of the opening for connection to the first mounting flange of the housing to join the single unit to the case.

19. An electric power steering system comprising: a case; a steering mechanism having a driven shaft disposed in the case for displacement therein, an input shaft for receiving a steering torque, and an output shaft connected to the input shaft and the driven shaft for outputting the steering torque to the driven shaft to drive the driven shaft; and a plurality of components preassembled into a single unit for removable connection to and disconnection from the driven shaft and the case as a single unit without independent connection and disconnection of any one of the components, the plurality of components of the single unit comprising a torque sensor for detecting the steering torque received by the input shaft of the steering mechanism, and an electric motor for outputting a steering assist force to the output shaft to power-assist the driving of the driven shaft.

20. An electric power steering system according to claim 19; wherein the plurality of components of the single unit further includes a power transmission for transmitting the steering assist force from the electric motor to the output shaft.

21. An electric power steering system according to claim 20; wherein the plurality of components of the single unit further includes a controller for controlling the electric motor.

22. An electric power steering system according to claim 20; wherein the plurality of components of the single unit further includes a housing containing therein the torque sensor, the power transmission and the electric motor.

23. An electric power steering system according to claim 22; wherein the housing has a first mounting flange at an end thereof; and wherein the case has an opening for receiving the output shaft of the steering mechanism for connection to the driven shaft, and a second mounting flange disposed at the periphery of the opening for connection to the first mounting flange of the housing to join the single unit to the case.

\* \* \* \* \*